(12) United States Patent
Grieve

(10) Patent No.: US 12,451,763 B1
(45) Date of Patent: Oct. 21, 2025

(54) AIR FLOW POWERED ELECTRICAL GENERATOR

(71) Applicant: Dennis Grieve, Star, ID (US)

(72) Inventor: Dennis Grieve, Star, ID (US)

( * ) Notice: Subject to any disclaimer, the term of this patent is extended or adjusted under 35 U.S.C. 154(b) by 620 days.

(21) Appl. No.: 17/736,992

(22) Filed: May 4, 2022

Related U.S. Application Data

(60) Provisional application No. 63/184,234, filed on May 5, 2021.

(51) Int. Cl.
| | | |
|---|---|---|
| *H02K 7/18* | (2006.01) | |
| *B60L 8/00* | (2006.01) | |
| *F03D 9/25* | (2016.01) | |
| *F03D 9/32* | (2016.01) | |

(52) U.S. Cl.
CPC .............. *H02K 7/183* (2013.01); *B60L 8/006* (2013.01); *F03D 9/25* (2016.05); *F03D 9/32* (2016.05); *F05B 2220/706* (2013.01); *F05B 2240/941* (2013.01)

(58) Field of Classification Search
CPC . B60L 8/006; H02K 7/183; F03D 9/25; F03D 9/32
USPC .......................................................... 180/2.2
See application file for complete search history.

(56) References Cited

U.S. PATENT DOCUMENTS

| | | | |
|---|---|---|---|
| 3,020,963 A | | 2/1962 | Hakkarinen |
| 3,444,946 A | | 5/1969 | Waterbury |
| 3,699,801 A | * | 10/1972 | Jones ........................ G01P 5/06 416/197 A |
| 3,876,925 A | * | 4/1975 | Stoeckert ................ B60L 8/006 180/2.2 |
| 3,897,170 A | * | 7/1975 | Darvishian ............. F03D 3/067 416/111 |
| 4,075,545 A | | 2/1978 | Haberer |
| 4,179,007 A | * | 12/1979 | Howe ....................... F03D 9/12 180/2.2 |
| 4,314,160 A | * | 2/1982 | Boodman .............. B60K 25/08 180/2.2 |
| 4,329,593 A | * | 5/1982 | Willmouth .............. F03D 3/062 290/55 |
| 4,414,805 A | * | 11/1983 | Walker ...................... F02C 9/56 60/39.43 |
| 4,543,836 A | * | 10/1985 | Call .......................... G01P 5/07 73/861.85 |
| 4,961,319 A | * | 10/1990 | Lyon ..................... F01D 17/165 60/602 |
| 5,280,827 A | * | 1/1994 | Taylor ..................... B60L 8/006 180/2.2 |

(Continued)

FOREIGN PATENT DOCUMENTS

WO        2009075865        6/2009

*Primary Examiner* — Jeffrey J Restifo
(74) *Attorney, Agent, or Firm* — AP Patents; Alexander Pokot

(57) ABSTRACT

An apparatus includes an axle; and a blade coupled to the axle for a rotation therewith about a rotational axis, the blade comprising a wall and a peripheral edge defining, in a combination with each other, a cavity of the blade. The blade may be provided as a plurality of blades. The blade may be disposed within a hollow interior of a housing. A generator of electric energy may be coupled to the axle to convert mechanical rotation at the axle into the electric energy. The apparatus may be used to charge a battery pack and/or as a direct power source for electric motors.

20 Claims, 9 Drawing Sheets

(56) References Cited

U.S. PATENT DOCUMENTS

| | | | |
|---|---|---|---|
| 5,680,032 A | 10/1997 | Pena | |
| 6,897,575 B1 | 5/2005 | Yu | |
| 7,147,069 B2 * | 12/2006 | Maberry | F03D 9/32 180/2.2 |
| 7,354,247 B2 | 4/2008 | Bonnet | |
| 7,387,182 B2 * | 6/2008 | Fleming | B60L 50/16 180/165 |
| 7,398,841 B2 * | 7/2008 | Kaufman | B60L 1/003 180/2.2 |
| 7,854,278 B2 * | 12/2010 | Kaufman | F03D 9/17 180/2.2 |
| 7,997,371 B2 * | 8/2011 | Khymych | F03D 13/20 180/2.2 |
| 8,317,480 B2 | 11/2012 | Scarpelli | |
| 8,354,756 B2 | 1/2013 | Ellis | |
| 8,513,828 B1 * | 8/2013 | Ripley | B60L 8/006 180/2.2 |
| 9,410,534 B2 | 8/2016 | Grieve | |
| 9,428,061 B1 * | 8/2016 | Ripley | B60L 50/53 |
| 9,512,825 B2 | 12/2016 | Jazzar | |
| 10,207,588 B1 * | 2/2019 | Roden | B60L 8/006 |
| 10,358,038 B1 * | 7/2019 | Ripley | H02K 7/183 |
| 10,583,707 B2 * | 3/2020 | Kaskowicz | F03G 7/08 |
| 10,724,502 B2 * | 7/2020 | Moore | F03D 7/06 |
| 11,143,163 B2 * | 10/2021 | Juarez | F03D 9/25 |
| 11,208,982 B2 * | 12/2021 | Palamara | F03D 1/02 |
| 11,249,103 B2 * | 2/2022 | Bush | G01P 5/06 |
| 11,267,335 B1 * | 3/2022 | Knickerbocker | F03D 3/0409 |
| 11,286,907 B1 * | 3/2022 | Rebek | H02K 7/183 |
| 11,499,523 B2 * | 11/2022 | Larsen | B23P 15/04 |
| 2011/0164977 A1 | 7/2011 | Vallejo | |
| 2011/0248666 A1 * | 10/2011 | Lorenson | B60L 8/006 320/101 |
| 2013/0156585 A1 | 6/2013 | Mangano | |
| 2015/0211482 A1 | 7/2015 | Radisek | |

* cited by examiner

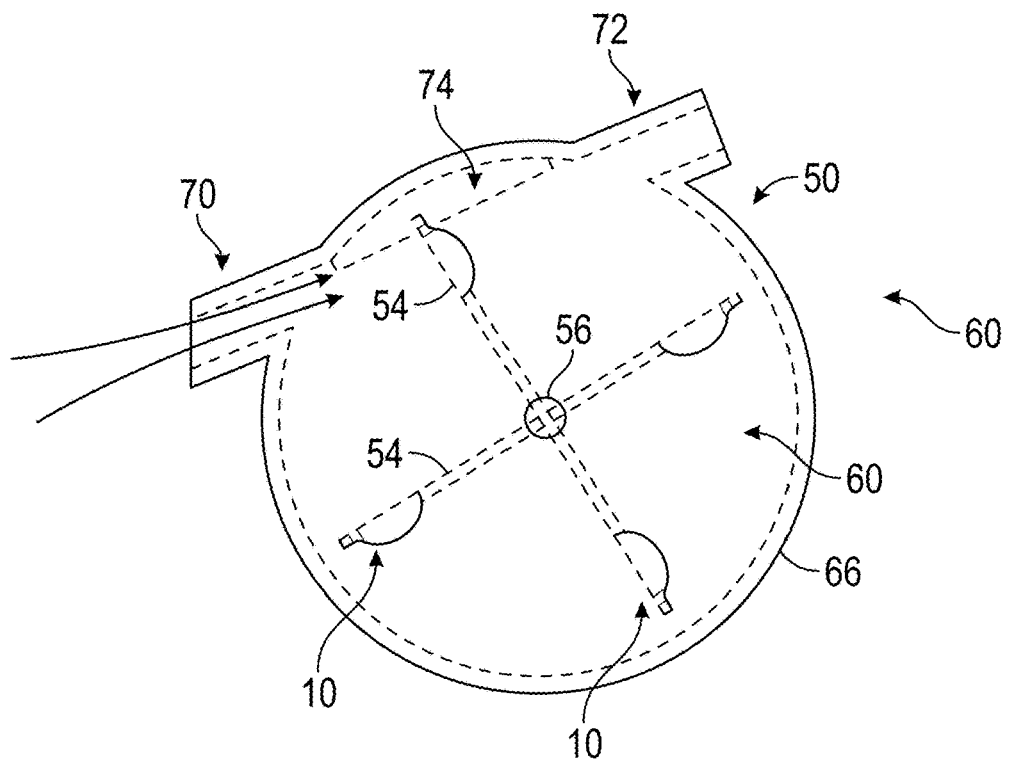
FIG. 5
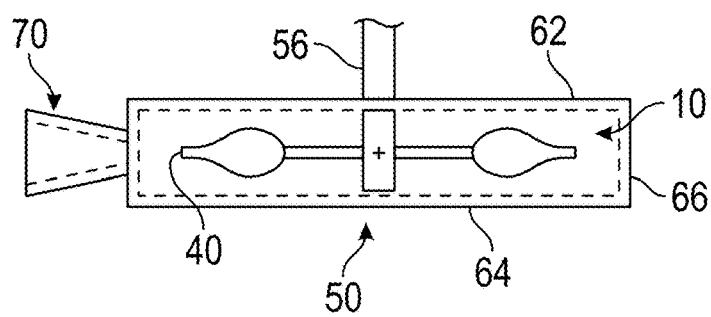
FIG. 6
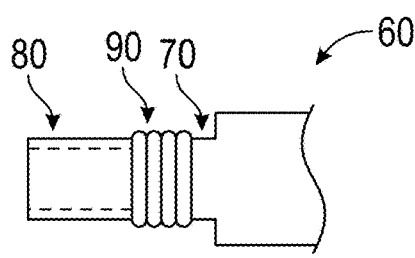 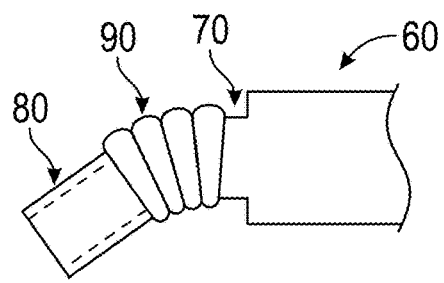
FIG. 7A  FIG. 7B

AIR FLOW POWERED ELECTRICAL GENERATOR

CROSS-REFERENCE TO RELATED APPLICATIONS

This present nonprovisional application is related to and claims benefit of priority under 35 U.S.C. sctn. 119(e) from U.S. Provisional Patent Application Ser. No. 63/184,234 filed on May 5, 2021 and titled "AIR FLOW POWERED ELECTRICAL GENERATOR", which is hereby incorporated by reference in its entirety.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to an electric generator. The subject matter may be related to an electric generator that converts kinetic energy of an air flow into an electric energy. The subject matter may be related to a battery charger. The subject matter may be related to a battery charger that converts kinetic energy of an air flow into an electric energy.

BRIEF DESCRIPTION OF THE DRAWINGS

The accompanying drawings are incorporated in and constitute part of the specification and illustrate various embodiments. In the drawings:

FIG. 5 illustrates a planar view of a housing with a bladed rotor;
FIG. 6 illustrates an elevation view of the housing with the bladed rotor of FIG. 5;
FIG. 7A-7B illustrate elevation view of an air duct connected to the housing.

DETAILED DESCRIPTION

Figure 1A:
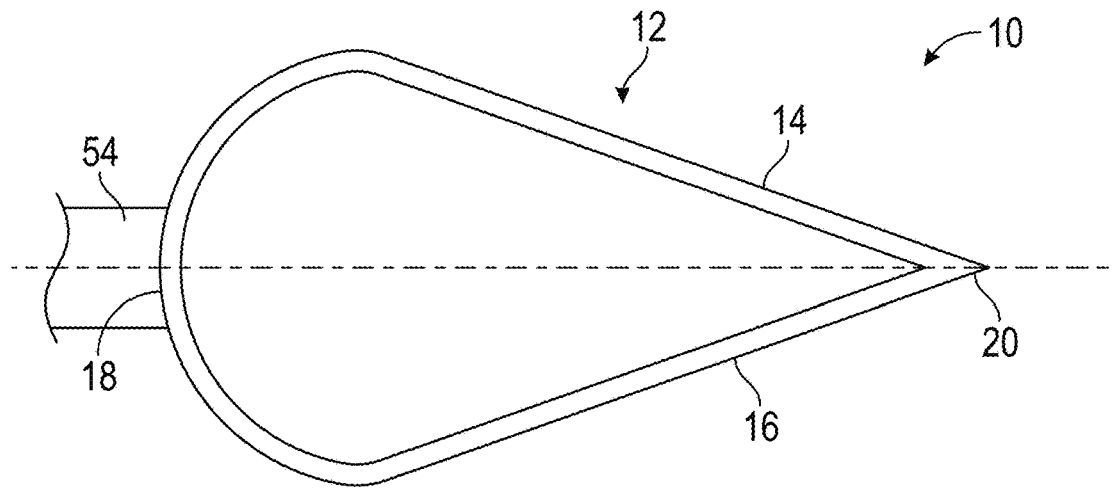
FIG. 1A illustrates an elevation view of a blade.

Prior to proceeding to the more detailed description of the present subject matter, it should be noted that, for the sake of clarity and understanding, identical components which have identical functions have been identified with identical reference numerals throughout the several views illustrated in the drawing figures.

It is to be understood that the singular forms "a," "an," and "the" include plural referents unless the context clearly dictates otherwise or expressly specified otherwise. Thus, for example, reference to "a component surface" includes reference to one or more of such surfaces.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives.

For purposes here, the words "comprising," "including," "having," and variants thereof, wherever they appear, shall be construed as open-ended terminology, with the same meaning as if the phrase "at least" were appended after each instance thereof.

The verb "may" is used to designate optionality/noncompulsoriness. In other words, something that "may" can, but need not.

Before elucidating the subject matter shown in the Figures, the present disclosure will be first described in general terms.

A member is provided to capture kinetic energy of the air flow and aid in converting the kinetic energy into a mechanical motion. Air flow may be wind. Air flow may be generated by wind. The member may be referred to as a blade. The blade may be designed with a peripheral edge and a wall that define a blade cavity. The blade cavity is open at the peripheral edge. The blade cavity may be referred to as a hollow interior of the blade. The blade cavity at the peripheral edge, and including an interior surface of the blade, may be referred to as a front of the blade as it will be oriented toward the air flow. The exterior surface of the blade cavity may be referred to as a rear of the blade. A distance between the interior and exterior surfaces defines a thickness of the wall. The wall may have uniform thickness. The wall may have a portion with a thickness being different than a thickness of another portion.

The peripheral edge may be designed with an upper or a first portion, a lower or a second portion, a proximal end portion joining the upper and lower portions, and a distal end portion. The lower and upper portions are related to orientation of the blade during use that, in view of the forgoing description, may be mounted for a rotation in a horizontal plane. The upper portion may be straight. The upper portion may be curved. The lower portion may be straight. The lower portion may be curved. The proximal portion may be curved. The proximal end portion defines a proximal end of the blade. The distal end portion defines a distal end of the blade.

The distal end portion may have a curved shape. The proximal end portion may have a curved shape. The curved proximal end portion and the curved distal end portion may be provided of an identical size. The curved proximal end portion and the curved distal end portion may be provided of an identical shape. The upper and lower portions may be provided of an identical size. The upper and lower portions may be provided of an identical shape. A distance between apexes of the distal and curved proximal end portions may be larger than a distance between apexes of the upper and lower portions. In other words, the peripheral edge of the blade may be provided in an oval shape where a length of such oval shape is disposed, during use, in a horizontal direction. A distance between apexes of the distal and proximal end portions may be smaller than a distance between apexes of the upper and lower portions. In other words, the peripheral edge of the blade may be provided in an oval shape where a length of such oval shape is disposed during use in a vertical direction.

The distal and proximal end portions and upper and lower portions may be identical in size and shape, thus defining a circle-shaped peripheral edge.

The upper and lower portions may be converging with each other at the distal end portion. The distal end portion may be made smaller than the curved proximal end portion. When the distal end portion is made smaller than the curved proximal end portion and when the upper and lower portions are converging with each other at the distal end portion. The peripheral edge may define curved upper and lower portions. The peripheral edge may define a teardrop shape of the blade. In other words, the blade may be designed as a single tear or shaped like a dropping tear. The peripheral edge may define straight upper and lower portions. The peripheral edge with the straight upper and lower portion may define a substantially teardrop shaped blade.

The wall may be designed as a single curved surface. The wall may be designed as a combination of curved and planar or flat surfaces. The wall may be designed as a combination of planar surfaces. In other words, the wall may have a frustoconical shape, except at the peripheral edge.

In a plane normal to a plane of the peripheral edge, the wall may define a first portion starting at the proximal end and a second portion ending at the distal end. The first portion may have a convex shape. The second portion may have a convex shape. The first portion may extend from the peripheral edge at a greater angle toward the second portion than the second portion extending toward the first portion.

Thus, the blade, as described above, may be referred to as a cup or as having a cup shape or as a cup shaped blade. The blade may be designed (configured) as any one of wing, an asp, a sail, an air foil, and a propeller. The blade may be referred to as an air flow catching element. The blade may be referred to as a wind catching element.

The wall may be further designed with an opening in each of the peripheral edge and the blade cavity, at the distal end. The opening may be used to expel any moisture carried with the air flow and that may otherwise accumulate on the interior surface of the blade cavity. The opening may be used to expel any contaminants carried with the air flow and that may otherwise accumulate on the interior surface of the blade cavity. The opening may be referred as a passageway. The passageway may be extending from the distal end of the blade and may be elongated. The elongated passageway may expel the moisture and/or contaminants in a direction of a drain. The elongated passageway may expel the moisture and/or contaminants in a direction of a moisture/contaminant catching component external to the blade. The elongated opening may be used to discharge moisture and/or contaminants external to the blade. The elongated passageway may define a substantially teardrop shape of the peripheral edge.

When the blade is designed with the opening, the first and second portions of the wall, as described above, may facilitate flow of moisture and/or contaminants within the blade cavity toward the opening.

The blade may be designed with a wall defining a peripheral edge and a blade cavity, and where the peripheral edge is designed with a curved upper portion, a curved lower portion, a curved proximal end portion joining the curved upper and lower portions, a distal end portion, and an opening in each of the peripheral edge and the blade cavity, at the distal end portion.

The blade (wall) may be constructed from a semi-rigid or rigid material that is relatively strong and lightweight such as any one of a plastic, sheet metal, aluminum, titanium, composite materials such as a fiberglass laminate or carbon composite, and any combination thereof. The blade may be constructed from a flexible material for example being any one of a fabric, a canvas, a nylon, a Teflon, a material associated with sailing application, and a material associated with water rafting application. If constructed of flexible material, the blade may include a support frame either within the interior surface of the blade cavity or an exterior surface of the blade cavity. Such support frame may be designed as a metal skeleton to support the basic shape that catches the air flow.

The blade is designed to be coupled to an axle. The axle may be referred to as a shaft. The shaft may be referred to as a drive shaft. The axle defines a rotational axis. A length of the axle extends along the rotational axis. Accordingly, the blade is coupled to the axle for a rotation therewith about the rotational axis. The axle may be solid throughout. The axle may be hollow throughout, the axle may be provided as a combination of solid and hollow portions. The axle may be mounted vertically during use. The axle may be mounted horizontally during use. The axle may be made longer than a height or a thickness of the blade.

The distal end of the blade may be directly attached to the surface of the axle. The distal end of the blade may be indirectly attached to the surface of the axle with a separate member. The separate member may be referred to as an attachment spar or a mounting spar. The blade may be welded or fused or attached mechanically, by bolts, rivets, pins, or other similar means.

More than one blade may be coupled to a single axle. Thus, an apparatus may be designed with an axle, as described above and with blade(s) as described above. Thus, an apparatus may be designed with an axle, as described above and with a plurality of blades where the blade can be provided as described above.

An apparatus may be designed with an axle extending along a rotational axis and a plurality of blades coupled to the axle for a rotation therewith about the rotational axis, where each blade is designed with a wall defining a peripheral edge and a blade cavity, and where the peripheral edge is designed with an upper portion, a lower portion, a curved proximal end portion joining the curved upper and lower portions, a distal end portion, and an opening in each of the peripheral edge and the blade cavity, at the distal end portion.

An apparatus may be designed with an axle extending along a rotational axis and a plurality of blades coupled to the axle for a rotation therewith about the rotational axis. Each blade may have a teardrop shape. The blade may be coupled to the axle so that an overall dimension of the teardrop shape in a direction perpendicular to the axle is larger than an overall dimension of the teardrop shape in a direction parallel to the axle. The axle may be referred to as a shaft. The axle may have an elongated shape where a length of the shaft is larger than a cross-sectional width of the axle.

The apparatus may be used to capture kinetic energy of air flow and generate a rotation at the axle. In other words, the apparatus may be used to convert kinetic energy of air flow into a mechanical energy. The apparatus may be used to capture kinetic energy of wind and generate a rotation at the drive shaft.

The apparatus may be referred to as a bladed rotor. The bladed rotor may be referred to as a fan. The bladed rotor may be used to capture kinetic energy of the air flow so as to generate electric energy. The apparatus to generate electric energy will include a generator of electric energy, the generator being coupled to the axle. The generator may be designed as or provided as an alternator. The generator may be designed to, configured to or provided to generate alternative current (AC). The generator may be designed to, configured to or provided to generate direct current (DC). Such DC generator may be provided with a split ring connected to the axle and brushes positioned to adjacent the exterior peripheral surface of the split ring.

The electric energy generator may be designed with a housing that encloses the blades. The housing may include a peripheral wall defining a hollow interior, an air inlet and an air outlet. One or the both of the air inlet and the air outlet may be through a peripheral wall. The housing may have one or two end walls connected to the peripheral wall. When the housing has two end walls, the hollow interior is generally closed, except for the air inlet and the air outlet. When the blades are mounted for a rotation about a vertical axis, the one or two end walls will be disposed generally horizontally, although portions of one or both end walls may be curved and/or slanted. The housing may have only one end wall defining a pan-shaped configuration prior to installation. The air inlet may be designed in selective communication with the air flow. When the blade has an opening to expel moisture and/or contaminants, as described above, the housing may be designed to catch expelled moisture and/or contaminants. In a non-limiting example, a trough may be provided within the hollow interior. The trough may be shaped and/or sized so that moisture and/or contaminants accumulated in the trough is discharged through the air outlet or another outlet provided within the housing to discharge moisture and/or contaminants. The trough may be provide don an interior surface of the peripheral wall. The trough may be disposed adjacent the air outlet. The trough may extend along an entire peripheral wall, except for the inlet and air outlet connections.

When the housing is provided, the bladed rotor is mounted for a rotation within the hollow interior of the housing. The axle (shaft) may extend outwardly from an end wall of the housing.

An air flow directing component may be provided to direct air flow onto the bladed rotor within the housing. The air flow directing component may be designed to maintain the air inlet in an open communication with the environmental elements. Such air flow directing component may be an air duct connecting the air inlet with an opening in an exterior surface of a structure that the housing is installed in. The air flow directing component may be simply the air inlet positioned adjacent the opening in an exterior surface of the structure. The air directing component may be designed as a flap provided in a pivot connection with the housing to move between a first position where the flap directs an air flow onto the bladed rotor through the air inlet and a second position where the flap prevents the air flow onto the bladed rotor. When flap is provided, a portion of the housing will extend from the air inlet to complete the passageway for air flow. The air directing component may be provided as an air duct that is coupled to the housing and that is designed to move between a first position where the air duct directs an air flow onto the bladed rotor and a second position where the air duct prevents the air flow onto the bladed rotor. The air directing component may be referred to as a flap. The air directing component may be referred to as a duct. The air directing component may be referred to as a door.

Air flow may be provided by wind. Thus, the apparatus may be used as a wind turbine, where the cup-shaped blades replace propeller-shaped blades and are mounted a top of the mast. The axle may be mounted vertically defining a vertical shaft turbine. The axle may be mounted horizontally defining a horizontal shaft turbine. The electric generator may be mounted at the top of the mast as well with the generator rotor being mounted on a common shaft. The generator may be mounted at the bottom of the mast and connected to the bladed rotor with an endless power transmission member being any one of a belt, cable, chain and wire. The bladed rotor may be enclosed into the housing. The bladed rotor may be open to the environmental factors.

A horizontal wind-aided electric generator may include a horizontal windmill with a generally vertical drive shaft mounted for rotation about a vertical axis and at least one wind drive unit mounted in a wind catching position on the drive shaft, the wind drive unit including a transverse cross member non-rotatably attached to the drive shaft, and at least two wind catcher elements mounted on the cross member on opposite sides of the pole and spaced radially outwardly therefrom, each wind catcher element having front and rear sides and a moisture discharge opening distal to the drive shaft, with the front side presenting greater resistance to wind flow thereover than the rear side when the sides are facing in an upwind direction, the wind catcher elements on each side of the cross member facing in opposite directions, such that a wind urges the drive unit to rotate in a direction wherein the upward facing front side is moving in a downwind direction. An electric generator is then drivingly connected to the drive shaft so as to produce electric energy in a response to the rotation of the drive shaft.

The bladed rotor, as described above, may be used to replace blade assembly described in U.S. Pat. No. 9,410,534 B2 titled "Wind Powered Electric Generator Having A Variable Speed Clutch Assembly" and issued on Aug. 9, 2016 to inventor of pending application. Teachings of U.S. Pat. No. 9,410,534 B2 are being incorporated herein by reference in their entirety.

Generated electric energy may be used in an electrical grid. Generated electric energy may be used to charge a battery. Thus, the apparatus, as described above, may be used as a battery charger. Any excess of electric energy after battery is fully charged may be used in the electrical grid. The generated electric energy may be used to operate a machine.

The battery charger may be used in a vehicle to charge the battery. In electric vehicle, such battery charger may be used to charge a battery pack.

When the battery charger includes the cup shaped blades, as described above, the battery charger may be mounted external to a vehicle body with the front of the blades positioned to receive the air flow.

When the battery charger includes the cup shaped blades, as described above, the battery charger may be mounted within a hollow interior of a vehicle body with the front of the blades positioned to receive the air flow. When the battery charger is mounted within the hollow interior, the air flow may be routed, via the air flow directing member, from openings in a front grill of the vehicle. When the battery charger is mounted within the hollow interior, the air flow may be routed, via the air flow directing member, from openings in a side grill of the vehicle. The air flow directing member may be provided as an air duct. The air duct may be manufactured as a rigid component. The air duct may be manufactured as a flexible component.

In view of the above, a battery charger for a vehicle may be mounted within a hollow interior of the vehicle body and being hidden from direct view. Such battery charger may be mounted at a bottom wall of the vehicle body. The bottom wall may be referred to as a floor board.

The battery charger may be designed with a bladed rotor, as described above and an alternator coupled to the bladed rotor. The rotor within the alternator may be connected to the axle by way of a coupling. The axle may be designed an integral part of the rotor. The battery charger may be designed with a bladed rotor and an electrical generator coupled to the bladed rotor. The electrical generator is designed to convert mechanical energy of the bladed rotor into an electric energy, either of an alternative current (AC) or a direct current (DC).

When the bladed rotor is mounted adjacent an opening through a thickness of the floor board of the vehicle body, a flap may be provided and designed to move between a first position where the flap directs, through the opening, an air flow onto the bladed rotor and a second position where the flap prevents the air flow onto the bladed rotor. The flap may be referred to as a door. The air flow causes generation of an electric energy at the alternator due to a rotation of the bladed rotor and the rotation of the shaft.

A lip, may be also referred to as a flange, may be provided on one edge of the flap to move the flap into the first position due to a presence of the air flow. The lip will extend outwardly to the exterior surface of the floor board. The lip may have a curved shape.

A biasing member may be provided to move the flap into the second position upon an absence of the air flow. The biasing member may be designed as a spring. The spring may be an extension spring. The spring may be a compression spring.

A flap may be provided without the lip. This flap may be connected to an actuator designed to move the flap between the first and second positions in a response to a control signal. The control signal may be outputted by a vehicle controller based on a speed of the vehicle. This control signal may be referred to as a speed signal. This control signal may be referred to as a vehicle movement signal. The vehicle controller may be programmed to output such speed signal when the vehicle is moving and discontinue output of the speed signal when the vehicle is not moving. The vehicle controller may be programmed to output such speed signal when electrical system of the vehicle is turned on and discontinue output of the speed signal when the electrical system of the vehicle is turned off. In other words, it is not necessary to selectively open and close the flap during vehicle operation.

The battery charger may be designed with a housing with a hollow interior, an air inlet, and an air outlet. A bladed rotor is mounted for a rotation within the housing. A shaft is coupled to the bladed rotor and extends outwardly from an exterior surface of the housing. Or a portion of the bladed rotor axle extends outwardly from the housing. An air duct with a hollow interior may be also provided. The hollow interior of the air duct being in an air flow communication with the hollow interior of the housing. The air duct may be provided as an integral component of the housing, as a one-piece assembly. When the bladed rotor is mounted adjacent an opening through a thickness of the floor board of the vehicle body, a pivot connection may be provided between a proximal end of the air duct and the housing where the air duct is designed to pivot between a first position where the air duct directs the air flow onto the bladed rotor and a second position where the air duct prevents the air flow onto the bladed rotor. A lip, may be also referred to as a flange, on a distal end of the air duct may be provided to move the air duct into the first position due to a presence of the air flow. A biasing member is designed to move the air duct into the second position upon an absence of the air flow.

The air duct may be provided without the lip. This air duct may be connected to an actuator designed to move the air duct between the first and second positions in a response to a control signal. The control signal may be outputted by a vehicle controller based on a speed of the vehicle. This control signal may be referred to as a speed signal. This control signal may be referred to as a vehicle movement signal. The vehicle controller may be programmed to output such speed signal when the vehicle is moving and discontinue output of the speed signal when the vehicle is not moving. The vehicle controller may be programmed to output such speed signal when electrical system of the vehicle is turned on and discontinue output of the speed signal when the electrical system of the vehicle is turned off. In other words, it is not necessary to selectively open and close the air duct during vehicle operation.

The cross section of the air duct may be designed with a uniform size and shape throughout along a distance between the distal and proximal ends. The cross-section of the air duct at the distal end may be larger than a cross-section of the air duct at the proximal end. The air duct may be designed to taper from the distal end to the proximal end. This tapered design may provide a venturi effect, increasing a velocity of the air flow at the proximal end as compared with a velocity of the air flow entering the distal end. The resulting increase in air flow's kinetic energy may increase rotational speed of the bladed rotor.

An opening of the air duct at the distal end may be a single opening. The distal end may be adapted with a wall and openings through the wall.

The battery charger may be further designed with a generator coupled to a distal end of the shaft, the air flow causing a generation of an electric energy at the generator due to a rotation of the bladed rotor and the rotation of the shaft.

The battery charger may be designed with a generator with a shaft; a first clutch affixed to the shaft that is coupled to the bladed rotor; a second clutch affixed to the shaft in the generator; and an endless elongated member connecting the first clutch with said second clutch; the battery charger being designed to convert a kinetic energy of the air flow into an electric energy at the generator.

Either with the flap or the air duct, the biasing member may be designed as an extension spring. Either with the flap or the air duct, the biasing member may be designed as a compression spring. One end of the spring is attached to a stationary component while the other end of the spring is attached to the flap or the duct. Either with the flap or the duct, the biasing member may be designed as an actuator coupled to the flap or the air duct, the actuator designed to move the flap or the air duct between a first position where the flap or the air duct directs the air flow onto the bladed rotor and a second position where the flap or the air duct prevents the air flow onto the bladed rotor. The actuator may be provided in a combination with the spring. The actuator may be configured to move the flap or duct into the first position with the spring returning the flap or the duct into the second position. The actuator may be provided as a solenoid. Solenoid may be of a linear type. The solenoid may be of a rotary type. Moveable portion of the solenoid may be connected to the flap or duct. The actuator may be provided as a linear actuator. The linear actuator may be a pneumatic cylinder. The linear actuator may be a hydraulic cylinder. The linear actuator may be electrically driven.

When air duct is provided, the pivot connection may be designed as an elastomeric sleeve, the elastomeric sleeve connecting one end of the air duct to the air inlet. The air duct may be further designed with a lip or a flange on an exterior surface of the air duct. The air duct may be designed with a gasket on an exterior surface of the air duct. The air duct may be designed with a lip or a flange on another edge of the air duct to contact, either directly or indirectly, the interior surface of the floor board so as to stop movement of the air duct external to the floor board.

The battery charger may be designed with a housing with a hollow interior, an air inlet, and an air outlet; a bladed rotor mounted for a rotation within the housing; a shaft coupled to the bladed rotor and extending outwardly from an exterior surface of the housing; an air duct with a hollow interior, the hollow interior of the air duct being in a selective air flow communication with the hollow interior of the housing; and an actuator coupled to the air duct, the actuator designed to move the air duct between a first position where the air duct directs the air flow onto the bladed rotor and a second position where the air duct prevents the air flow onto the bladed rotor.

The battery charger may be designed with a housing with a hollow interior, an air inlet, and an air outlet; a bladed rotor mounted for a rotation within the housing; a shaft coupled to the bladed rotor and extending outwardly from an exterior surface of the housing; and an air duct with a hollow interior being in a selective air flow communication with the hollow interior of the housing, the air duct designed to move between a first position where the air duct directs the air flow onto the bladed rotor and a second position where the air duct prevents the air flow onto the bladed rotor.

The air flow powered electric generator for a vehicle may be designed with a housing with a hollow interior; a bladed rotor mounted for a rotation within the housing; a shaft coupled to the bladed rotor and extending outwardly from an exterior surface of the housing; an air duct with a hollow interior, the hollow interior of the air duct being in an air flow communication with a hollow interior of the housing; a pivot connection between the air duct and the housing where the air duct is designed to pivot between a first position where the air duct directs the air flow onto the bladed rotor and a second position where the air duct prevents the air flow onto the bladed rotor; a lip on one edge of the air duct to move the air duct into the first position due to a presence of the air flow; and a biasing member designed to move the air duct into the second position upon an absence of the air flow.

The shaft may be connected to an alternator or AC/DC generator. Also disclosed herein is a vehicle that includes a vehicle body, two wheel assemblies supporting the vehicle body thereon, a battery, a drive system designed to convert electric energy into a mechanical energy to rotate wheels within the two wheel assemblies, and a controller designed to receive and regulate electric energy from the battery. The vehicle may be provided as any one of a sedan, a cross-over, a hatchback, an SUV, a truck, and a van. The vehicle body may include any one of a passenger compartment, a trunk, a drive system compartment and a bed. The drive system may be designed with an electric traction motor, a transmission and an inverter designed to send electric energy to the electric motor causing rotation of the wheels through the transmission. The drive system may be designed with an electric motor at two wheels, an inverter designed to send electric energy to the electric traction motors causing rotation of wheels in the two wheels. The drive system may be designed with an electric motor at each wheel of the vehicle. The drive system may be designed with a single electric motor and a drive linkage to two or more wheels.

The vehicle may further include an air duct designed to move between a first position and a second position, a lip on one edge of the air duct to move the air duct into the first position due to a presence of the air flow, a biasing member designed to move the air duct into the second position upon an absence of the air flow, and a battery charger designed to charge the battery by converting, during movement of the vehicle, a kinetic energy of the air flow into an electric energy after the air duct is moved into the first position to direct the air flow toward the electric energy generator. The battery charger includes a bladed rotor, a shaft coupled to the bladed rotor and extending outwardly therefrom, an alternator coupled to a distal end of the shaft, the air flow causing a generation of an electric energy at the alternator due to a rotation of the bladed rotor and the rotation of the shaft. The air duct may be positioned to move within an opening through a thickness of a bottom wall in the vehicle body. In a first position, the air duct uncovers the opening and allows entry of the air flow. In a second position, the air duct covers the opening.

To direct air flow onto the bladed rotor, the apparatus may be designed with a lip on one leading edge of the air duct. The lip will be positioned and configured to extend outwardly from an exterior surface of the vehicle body when the air duct is disposed in the second position. The apparatus may be also designed with a spring positioned in a contact with the air duct to move the air duct into the second position upon absence of the air flow. The spring is sized to allow the air flow acting onto the lip to move the air duct into the first position. In a non-limiting example, the spring may be sized to allow movement of the air duct into the first position when the vehicle spring reaches a speed of five (5) miles per hour. It would be understood that the air duct will remain in such first position until the speed of the vehicle reduces below the five (5) miles per hour.

To direct air flow onto the bladed rotor, the apparatus may be designed with an actuator connected to the air duct and electrically connected to the controller, the actuator designed to move the air duct into the first position in a response to a first control signal received from the controller, the actuator designed to move the air duct into the second position in a response to a second control signal received from the controller. The first control signal indicates movement of the vehicle. In the vehicle, the actuator may be electrically connected to the vehicle controller. The vehicle controller may be programmed to operate the actuator based on a speed of the vehicle. The actuator may be provided with its own controller that is electrically connected to the vehicle circuit.

To discharge moisture and/or contaminants, the outlet of the housing may be positioned in an alignment with another opening through the thickness of the bottom wall. Another flap or door may be also provided to selectively move between a first position to open the another opening and a second position to close the another opening. A bias member, as described above, may be also provided to move the flap or door into the second position. The another flap or door may move into the first position due to the air flow discharged from the housing. The flap or door being in the first position may generate a vortex effect. The vortex effect may facilitate discharge of moisture and/or contaminants from the housing and therefore from the vehicle.

The air flow powered electric generator, as described above, may be used, in a hybrid arrangement with an auxiliary battery, to directly power an electric motor in a further absence of an electric battery pack. In this design, the auxiliary battery is configured with a sufficient capacity to power vehicle controls and the electric motor until the vehicle attains speed allowing the rotation of the bladed rotor and generation of electric energy at the air flow powered electric generator. A regenerative braking design may be used to recharge the auxiliary battery from the electric motor. Regenerative braking design may reduce capacity of the auxiliary battery.

Thus, a vehicle may be designed with a vehicle body, the vehicle body is designed with an opening through a thickness of a bottom wall; two or more wheel assemblies supporting the vehicle body thereon; a battery; a drive system is designed with an electric motor, and a transmission, the electric motor designed to convert electric energy into a mechanical energy to rotate wheels within each wheel assembly through the transmission; a controller; an electric energy generator coupled to one of the electric motor, the battery and the combination thereof, the electric energy generator designed to supply, during movement of the vehicle, the electric energy by converting a kinetic energy of the air flow into the electric energy; and an air duct with a hollow interior, the air duct being at least partially mounted within the opening, the air duct designed to move between a first position where the air duct directs the air flow to the electric energy generator and a second position where the air duct prevents the air flow to the electric energy generator. This vehicle may not require a pack or grid of batteries but may require an auxiliary battery. In a non-limiting example, a 12V car battery may be provided to supply electric energy when the vehicle is stationary and/or starting to move. In other words, this vehicle employing the apparatus, as described above, may be lighter in size, may cost less as the battery pack/grid is reduced in size or eliminated, and may reduce or eliminate pollution associated with production of batteries. Even when the battery or the grid of batteries is required, such battery or grid of batteries can be reduced in size as the electric energy is generated during vehicle movement.

The vehicle may be also a hybrid vehicle employing a gas-powered engine and electric motor(s) where the electric generator generates electric energy to operate electric motor(s).

In any apparatus, as described above, the air duct may be adapted with an optional screen mounted to prevent debris infiltration into the hollow interior. Such optional screen may be mounted at inlet of the housing. Such optional screen may be attached, either externally or internally, to the air duct.

The vehicle may be adapted with an optional heater mounted adjacent a periphery of the air duct, the heater being electrically connected to the controller and is being operable in a response to a temperature signal from the controller. The heater, when provided, melts any accumulation of ice and/or snow around the opening.

An optional heater may be also provided on each blade. In a non-limiting example, such heater may be provided as a wire connected to a source of electric energy. The wire may be disposed on the exterior surface of the blade cavity.

In the vehicle, the bladed rotor may be mounted for a rotation about a vertical axis. In the vehicle, the bladed rotor may be mounted for a rotation about a horizontal axis. It will be understood that the housing and air inlet (air passageway) will be sized and shaped accordingly.

The apparatus, as described above, may be provided as an alternator that includes a stationary stator with a magnetic field, the stator defining an axis of rotation, a rotor with an armature, the rotor being mounted for a rotation about the axis of the rotation where the axis of rotation is defined by the stator, and a plurality of cups, each cup from the plurality of cups being attached to the rotor for a rotation therewith, each cup having an opening distal to the axis of rotation, the opening designed to expel moisture and/or contaminants outwardly from the interior of the cup. In other words, the alternator may be designed with a hollow rotor. The alternator designed to generate alternative current (AC) in a response to a rotation of the cups due to air flow applied thereto.

The bladed rotor may be provided as a hollow tube with the blades attached, either directly or indirectly, to the exterior surface of the tube. An internally-toothed gear is disposed on an interior surface of the tube. The internally-toothed gear is connected to a central gear by an intermediate gear. The central gear is connected to the generator (turbine). The intermediate gear may be connected and disconnected as needed. As a result of the gearing system, the rotational speed may be multiplied many times over. The internally-toothed gear is large with many teeth, and the central gear is small with fewer teeth, resulting in a multiplication of rotational speed. Multiplication of rotational speed may increase efficiency of the apparatus.

The apparatus to harvest wind energy may be designed with a first shaft and a second shaft mounted in a side-by-side spaced apart relationship with the first shaft. In this design, the blades, as described above, are affixed to the first shaft. A variable clutch arrangement is also provided and includes a driving first clutch affixed to the first shaft, a driven second clutch affixed to the second shaft, and an endless elongated member connecting the first clutch with the second clutch, each of the first and second clutches includes a pulley defined by a pair of halves mounted for movement to and away from each other along an axis of a respective rotor shaft, a pulley on the second clutch rotates at greater speeds than a pulley on the first clutch. Each blade may comprise a teardrop shape. Each blade may comprise a concave shape defining a peripheral edge and a blade cavity, the peripheral edge comprising a curved upper portion, a curved lower portion, a curved proximal end portion joining the curved upper and lower portions, a distal end portion, and an opening in each of the peripheral edge and the blade cavity, at the distal end portion.

In view of the above, a method of generating electric energy from a kinetic energy of air flow may include the steps of attaching teardrop-shaped blades to a shaft, connecting the shaft to an electric energy generator and generating, with the electric energy generator, the electric energy in a response to a rotation of the shaft due to kinetic energy of the air flow.

In view of the above, a method of powering a vehicle may include the steps of installing a wind turbine within an interior confines of a vehicle, connecting the wind turbine to an opening through a thickness of the bottom wall of the vehicle, converting the kinetic energy of the wind into electric energy through a rotational motion of a bladed rotor within the wind turbine and using generated electric energy to power electric motor of the vehicle.

In view of the above, a method of powering a vehicle may include the steps of installing a wind turbine within an interior confines of a vehicle, converting a kinetic energy of the wind into electric energy through a rotational motion of a rotor with teardrop-shaped blades within the wind turbine and using generated electric energy to power electric motor of the vehicle.

In view of the above, a method of charging a battery in an electric vehicle may include the steps of installing a wind turbine within an interior confines of a vehicle, connecting the wind turbine to an opening through a thickness of the bottom wall of the vehicle, converting the kinetic energy of the wind into electric energy through a rotational motion of a bladed rotor within the wind turbine and using generated electric energy to charge the battery.

The air flow powered electric generator, as described above, may be installed during manufacturing of a new electric vehicle. On such vehicle, a capacity of the (main) battery may be designed based on recharging rate during movement of the vehicle. Movement of the vehicle may depend on type of driving and/or traffic conditions. Highway driving type with lower impact of traffic clogs may reduce a capacity of the battery. Highway driving or urban driving often associated with a stop-and-go mode may require a larger battery or a more frequent charging of the battery.

The air flow powered electric generator, as described above, may be used to retrofit an electric vehicle already in use. The retrofit may include installing the air flow powered electric generator in a space within the interior confines of the vehicle, where the space is created by a removal at least a portion of a battery pack. The retrofit may include cutting an opening through a thickness of the bottom wall of the vehicle and attaching a door for a pivoting movement to selectively open and close the opening. The retrofit may also include adapting the door with an external flange to open the door with an air flow during movement of the vehicle. The retrofit may include cutting an opening in the bottom wall of the vehicle and installing an air duct for a pivoting movement to selectively open and close the opening. The retrofit may also include adapting the air duct with an external flange to open the door with an air flow during movement of the vehicle. The retrofit may include electrically coupling the air flow powered electric generator to any one of a battery pack, an electric motor, a vehicle controller and vehicle controls.

Now in a reference to the drawings.

FIG. 1A illustrates an elevation view of a blade 10 with a peripheral edge 12 and a blade cavity 30. The peripheral edge 12 is illustrated as defining a substantially teardrop shape of the blade. The peripheral edge 12 has an upper edge portion 14, a lower edge portion 16, a proximal end 18 and a distal end 20. The blade 10 has a wall 22. The blade 10 is further being illustrated as connected to a member 238.

Figure 1B:
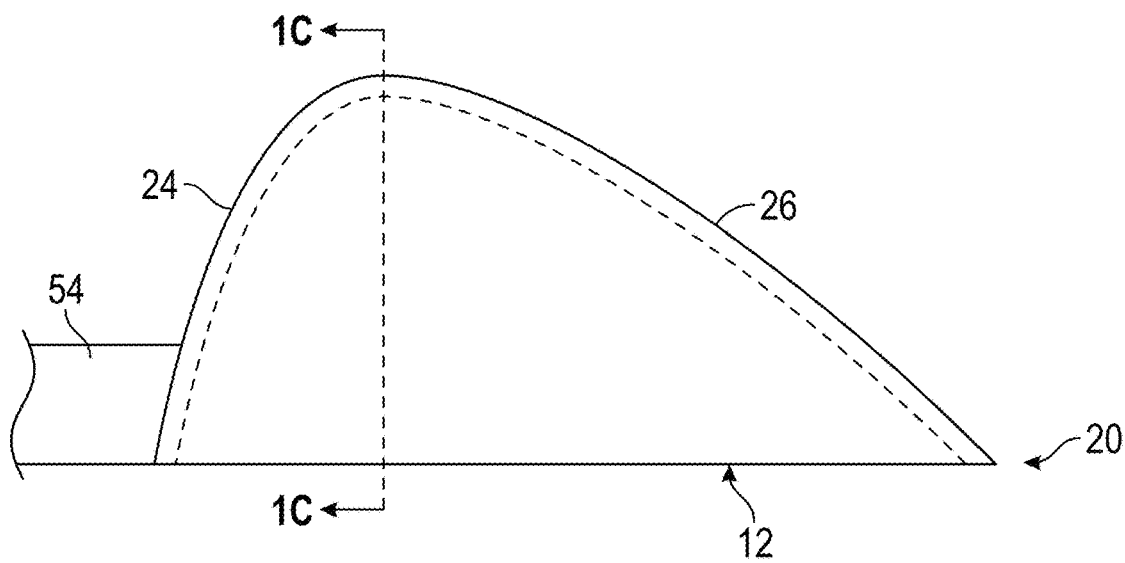
FIG. 1B illustrates a top view of the blade of FIG. 1A.

FIG. 1B illustrates a top view of the blade of FIG. 1A. The proximal end 18 is illustrated as being larger than the distal end 20. FIG. 1B also illustrates that in a plane normal to a plane of the peripheral edge 12 the wall 22 may define a first portion 24 starting at the proximal end 18 and a second portion ending at the distal end 20.

Figure 1C:
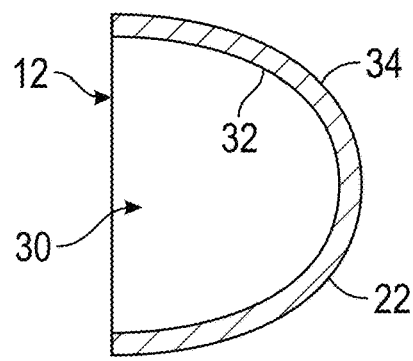
FIG. 1C illustrates a cross-sectional view of the blade along lines 1C-1C in FIG. 1B.
Figure 2A:
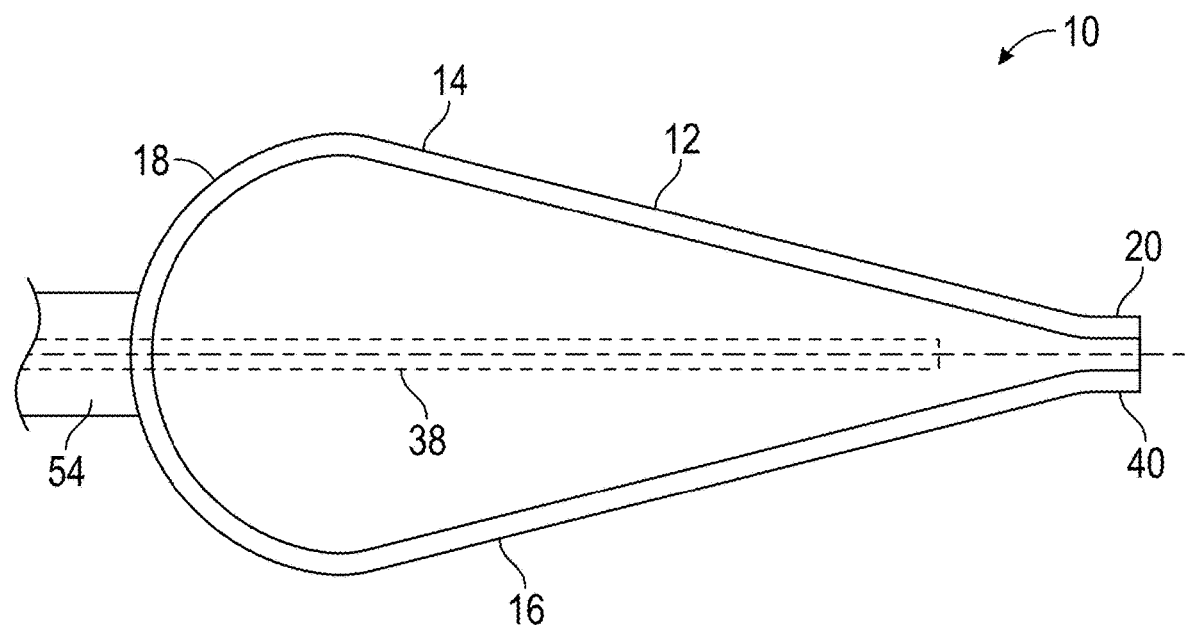
FIG. 2A illustrates an elevation view of a blade.
Figure 2B:
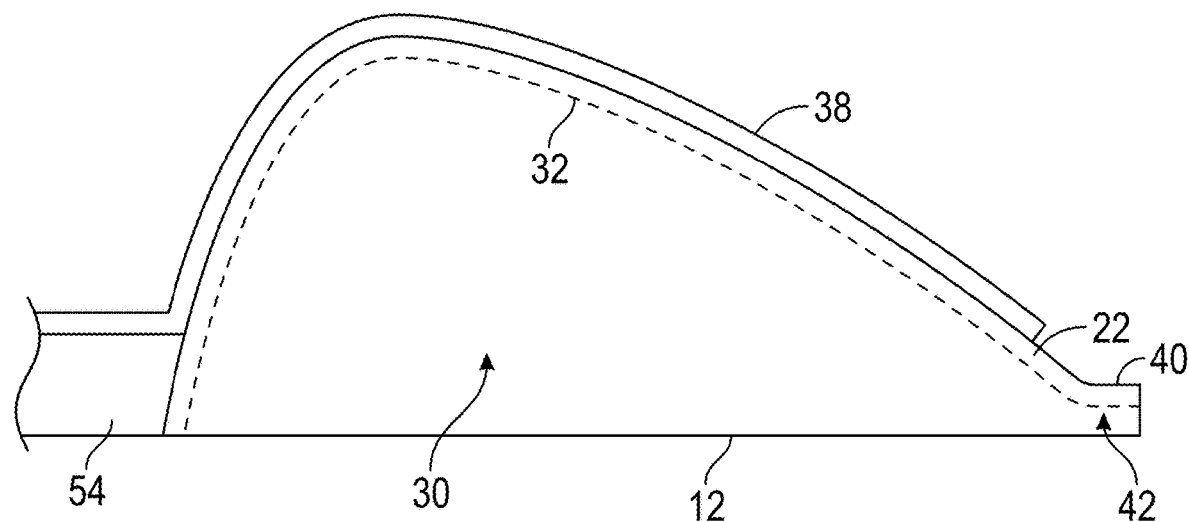
FIG. 2B illustrates a top view of the blade of FIG. 2A.

FIG. 1C illustrates a cross-sectional view of the blade along lines 1C-1C in FIG. 1B. The wall 22 also has an interior surface 32 and an exterior surface 34. The exterior surface 38 is spaced from the interior surface 32 to define a thickness of the wall 22. The wall 22 is illustrated in FIG. 1A with a uniform thickness. The wall 22 may have a varied thickness. Wall 22 is illustrated with a generally constant radius. The wall 22 may be constructed with two or more radii. In other words, the wall 22 may have a complex or a compounded shape. The blade 10 is mounted during use so that the blade cavity 30 receives (catches) the air flow. FIG. 2A illustrates an elevation view of a blade 10 with a peripheral edge 12 and a blade cavity 30. The peripheral edge 12 is illustrated as defining a substantially teardrop shape of the blade. The peripheral edge 12 has an upper edge portion 14, a lower edge portion 16, a proximal end 18 and a distal end 20. The blade 10 has a wall 22. An optional extension 40 may be provided on the distal end 20 and may include an optional opening or passageway 42. Such design may facilitate movement of the moisture and/or contaminants to the passageway 40 and subsequent removal of the moisture from the interior of the blade 10. An optional heater 38 is also illustrated as a wire. The blade 10 is further being illustrated as connected to a member 54.

Figure 3:
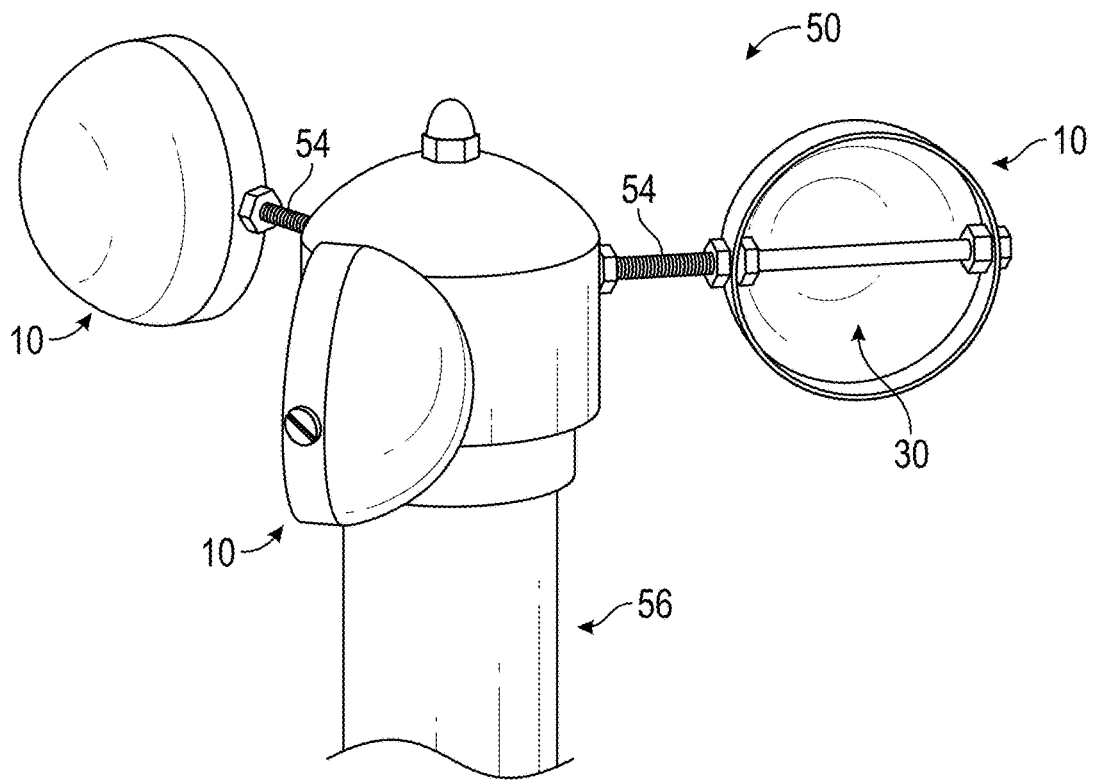
FIG. 3 illustrates a perspective view of a bladed rotor.

FIG. 3 illustrates a perspective view of a bladed rotor 50 that includes three (3) blades 10, although the bladed rotor 50 can include less or more blades 10. FIG. 3 also illustrates blades 10 connected to a rotor 50. The bladed rotor 50 is illustrated with blades a 10 of a semispherical shape and with a semicircular shaped peripheral edge 12 but may be designed with the substantially teardrop shaped blade of FIGS. 1A-2B.

Figure 4:
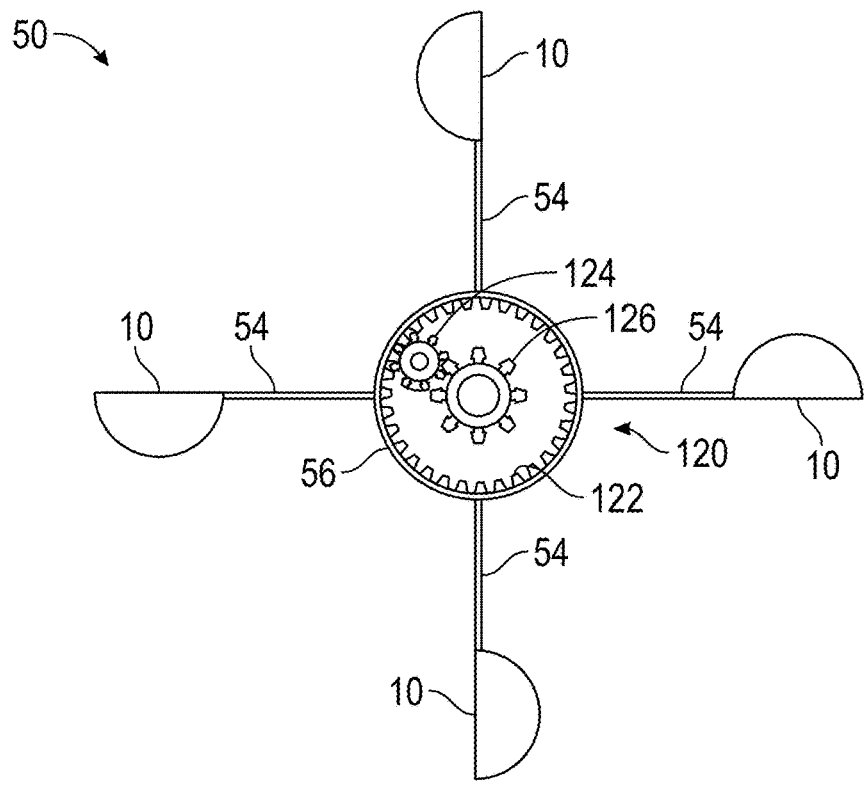
FIG. 4 illustrates a planar view of a bladed rotor with a gear arrangement.

FIG. 4 illustrates a planar view of a hollow bladed rotor which has blades 10 and a gear arrangement 120 mounted within a hollow bladed rotor 50. A peripheral gear 122 meshes with a central gear 126 via an intermediate gear 124. Central gear 126 will rotate faster than the peripheral gear 122. The gear arrangement 120 may be referred to as a planetary gear or a planetary gear assembly.

FIGS. 5-6 illustrate a housing 60 that houses a bladed rotor 50 that is designed with blades 10 of FIGS. 1A-2B. The housing 60 has walls 62 and 64 and a peripheral edge 66 that define, in a combination with each other, a hollow interior 68. The bladed rotor 50 is mounted within the hollow interior 68. The bladed rotor 50 is further being illustrated with an axle (shaft) 56. Air inlet 70 and air outlet 72 are also illustrated. A discharge catch 74 may be provided within the hollow interior 68. The catch 74 is positioned to receive moisture and/or contaminants discharge from the distal end 20 or from optional opening 40. The catch 74 is sized and shaped to route the moisture and/or contaminants discharge to the air outlet 72. The air outlet 72 may be connected to a drain (not shown).

FIG. 7A-7B illustrate elevation view of an air duct 80 connected to the inlet 70 of the housing 60. FIGS. 7A-7B further illustrate a flexible connection 90 between the air duct 80 and the air inlet 70, where the air duct can move between a first position of FIG. 7A and a second position of FIG. 7B.

Figure 8:
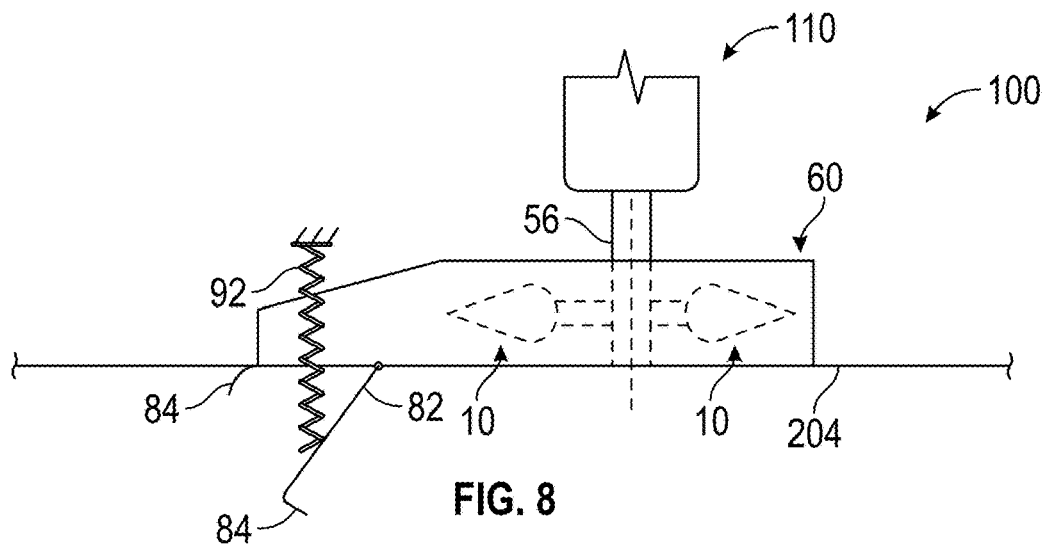
FIG. 8 illustrates an elevation view of an electric generator.

FIG. 8 illustrates an elevation view of an apparatus 100 that includes a housing 60 and an electric generator 110. The apparatus 100 may be designed for mounting on a floor board 204 of a vehicle 200. The housing 60 may be provided with flanges with apertures to be fastened to the floor board 204. The housing may 60 be welded to the floor board 204. FIG. 8 illustrates bladed rotor 50 with a vertical axle (shaft). In other words, the blades 10 rotate in a generally horizontal plane. The air flow may be provided by a flap 82 with a lip 84. Bias spring 92 is also shown.

Figure 9:
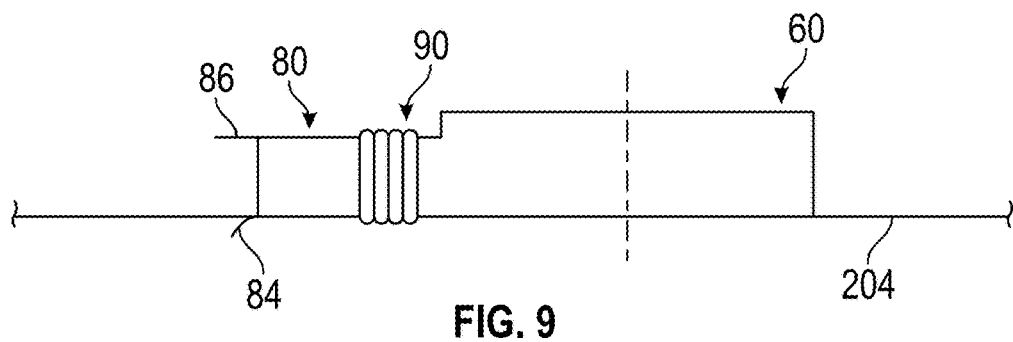
FIG. 9 illustrates an elevation view of a housing with a movable air duct.
Figure 10:
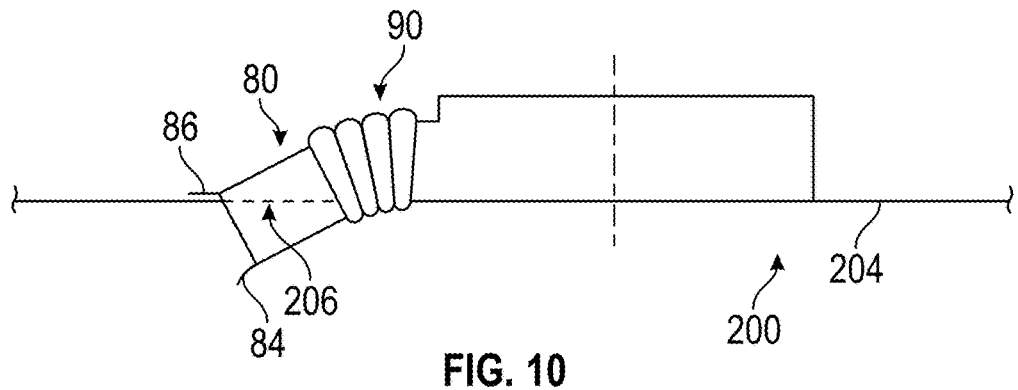
FIG. 10 illustrates an elevation view of a housing with a movable air duct.

FIG. 9-10 illustrate the above described movable air duct 80 with a flexible connection 90, a lip 84 and a lip or flange 86 to allow air flow through an opening 206 in a bottom wall of a floor board 204. The lip 84 moves the air duct 80 into the second position of FIG. 10 due to kinetic energy of the air flow as the vehicle 200 is in motion. Lip or flange 86 are sized and shaped to seal the opening 206 when the air duct 80 is in the second position.

Figure 11:
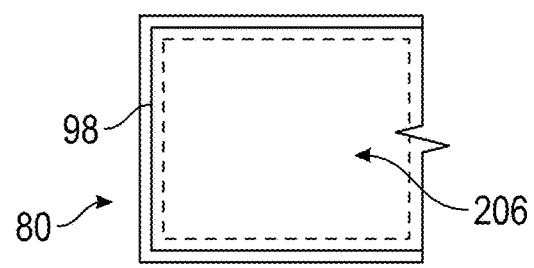
FIG. 11 illustrates a partial planar view of the air duct.

FIG. 11 illustrates an optional heater 98 that may be installed around the periphery of opening 206 so as to melt any ice or snow accumulation external to the floor board 204. The optional heater 98 may be mounted to the housing 60 and/or the air duct 80.

Figure 12:
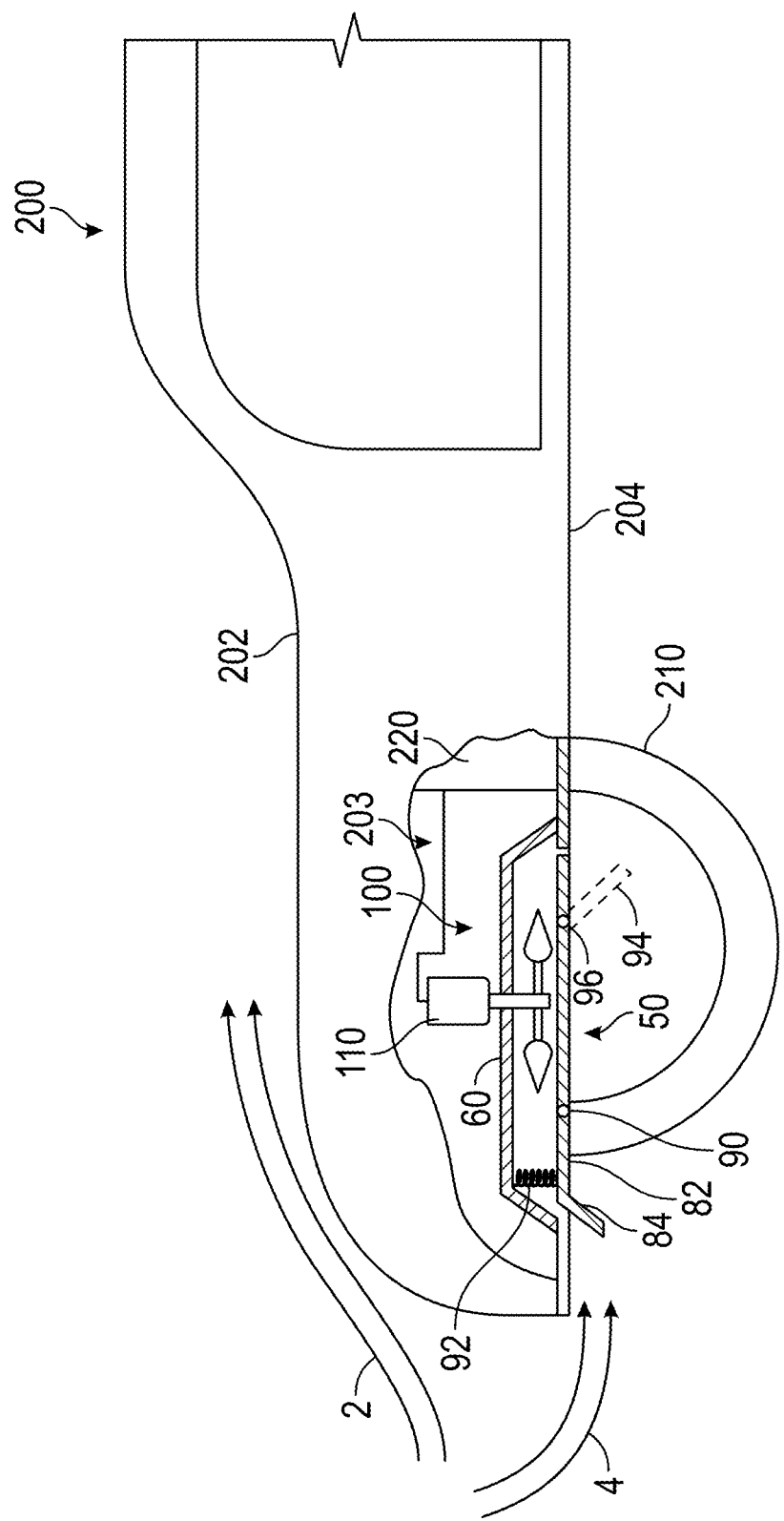
FIG. 12 illustrates a schematic diagram of an air flow powered electric generator mounted within a vehicle, partially illustrated.

FIG. 12 illustrates a schematic diagram of an air flow powered electric generator (apparatus) 100 mounted within a hollow vehicle body 202 of the vehicle 200, partially illustrated. Further illustrated is the flap 82 with the lip 84, a hinge 90 to pivot the flap 82 between first and second positions and a spring 92 to return the flap 82 into the second position. In the first position, the flap 82 directs under the car component 4 of the air flow toward the blades 10. The over car component 2 of the air flow is also illustrated. FIG. 12 illustrate another flap 94 that is attached with a hinge 96 to the vehicle body 202 to discharge moisture and/or contaminants external to the vehicle 200. The electric generator 110 is connected to the battery 220. FIG. 12 illustrates the air flow powered electric generator 100 mounted at a front of the vehicle 200 where air flow 4 will be the strongest. The air flow powered electric generator 100 can be configured so that blades 10, being illustrated as rotating in a generally horizontal plane, will rotate in a generally vertical plane. The air flow powered electric generator 100 may be mounted in other locations within the vehicle 2. When the air flow powered electric generator 100 is mounted toward a rear portion of the vehicle 2 the size of the blades 10 may be larger than the size of the blades 10 in the air flow powered electric generator 100 mounted toward the front of the vehicle 2 to increase amount of air flow rotating the bladed rotor 50. FIG. 12 also illustrates that the floor board 204 may provide a second end wall of the housing 60.

Figure 13:
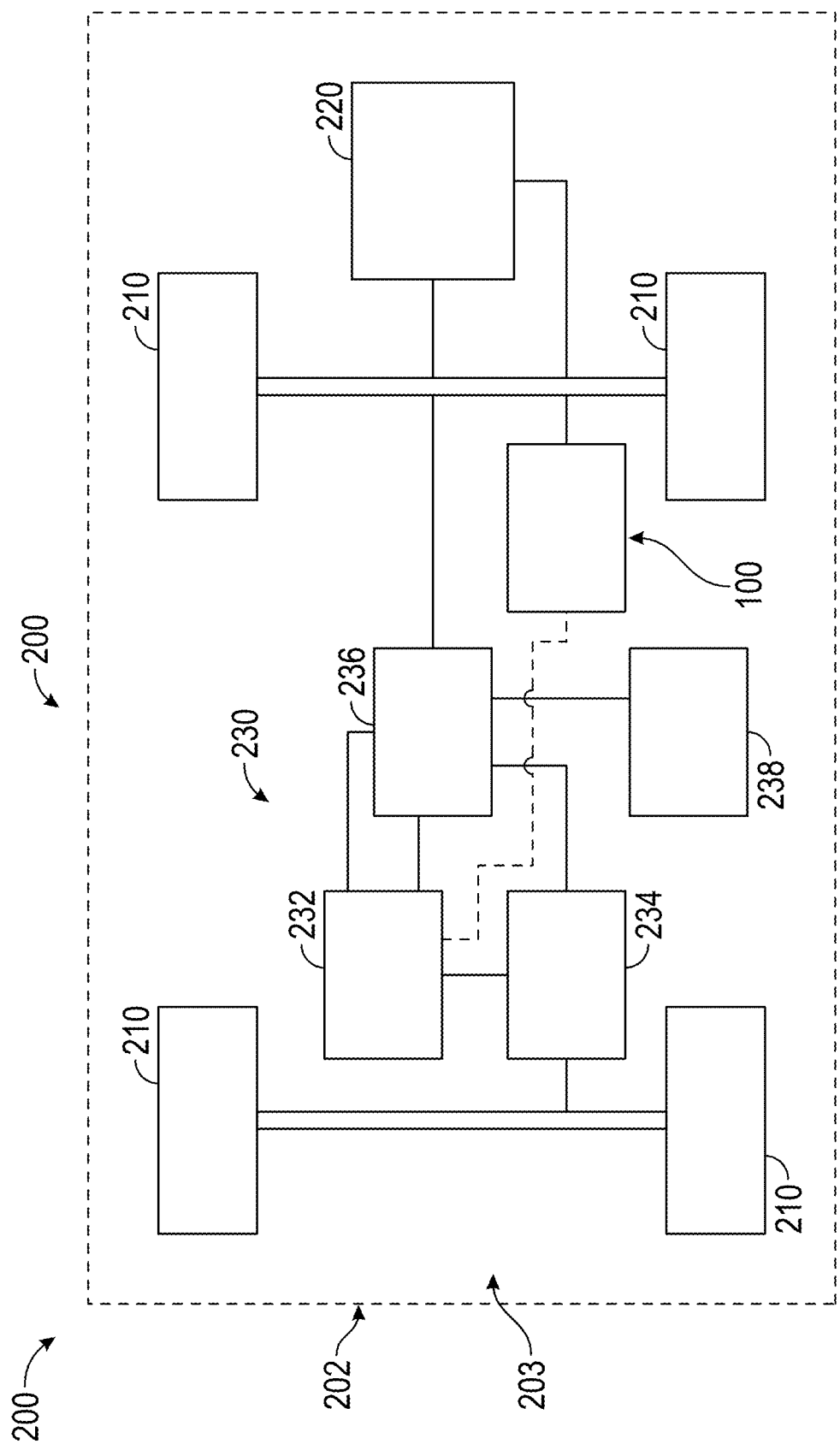
FIG. 13 illustrates a block diagram of a vehicle employing an air flow powered electric generator.

FIG. 13 illustrates a block diagram of a vehicle 200 employing an air flow powered electric generator 100. A vehicle 200 includes a vehicle body 202 with an interior (hollow) compartment 203. Two (or more) wheel assemblies with wheels 210 support the vehicle body 202 thereon. A battery 220 is connected to the drive system 230 that includes an electric motor 232 and a transmission 234. A controller is shown at 238 and an inverter is shown at 236. Such air flow powered electric generator may include an alternator.

Figure 14:
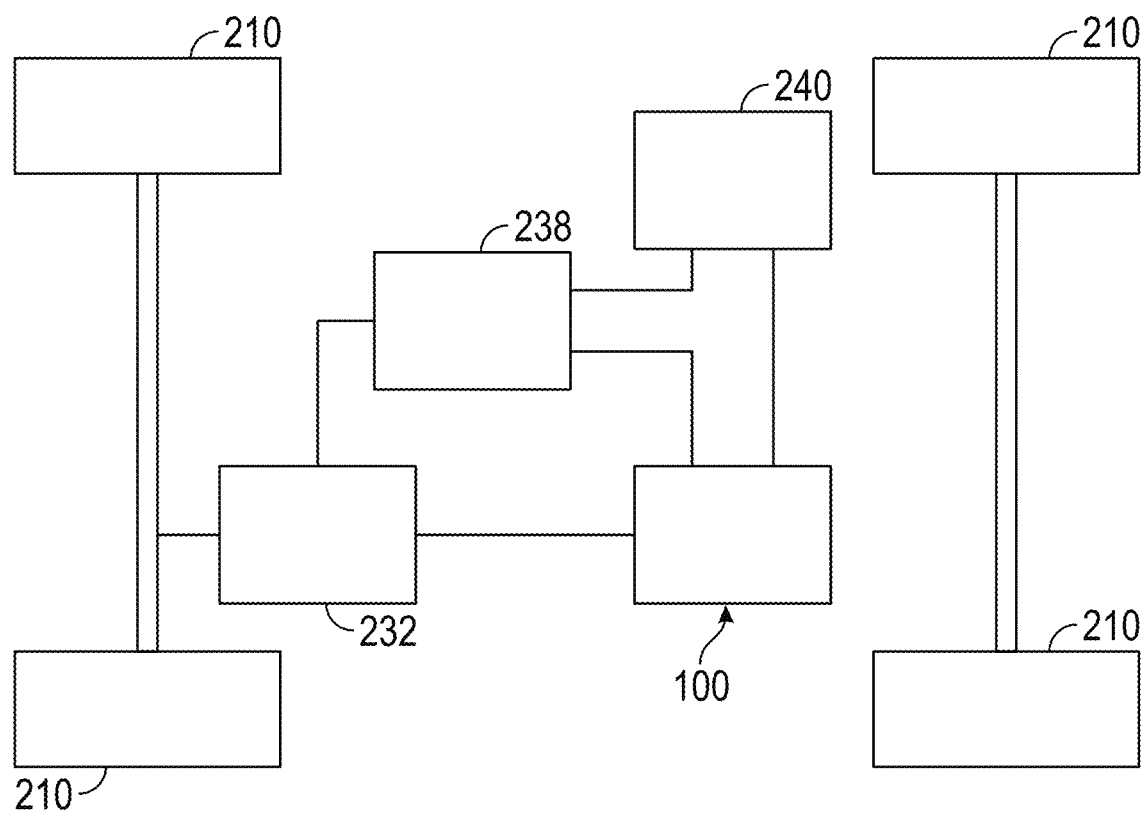
FIG. 14 illustrates a block diagram of a vehicle employing an air flow powered electric generator.

FIG. 14 illustrates a block diagram of a vehicle employing an air flow powered electric generator 100 that is coupled directly to the electric motor(s) 232. A small battery 240, for example as a conventional 12V car battery may be provided to supply electric energy when the vehicle is stationary and/or starting to move.

Figure 15:
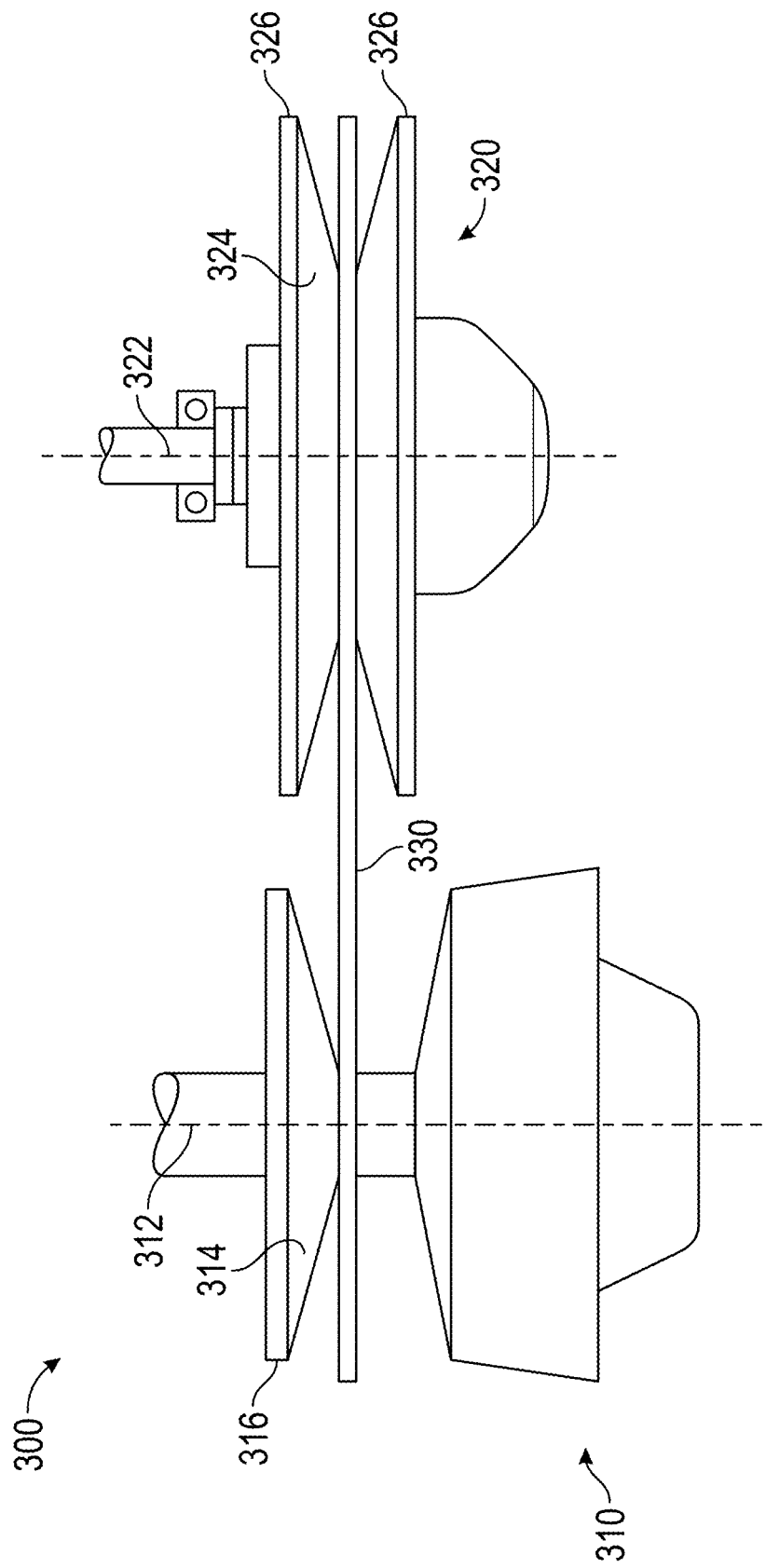
FIG. 15 illustrates a schematic view of a pair of variable speed clutches usable within an air flow powered electric generator.

FIG. 15 illustrates a schematic view of a pair of variable speed clutch assembly 300 usable within an air flow powered electric generator. A first shaft 312 and a second shaft 322 are illustrated as being mounted in a side-by-side spaced apart relationship with each other. In this design, the blades 10, as described above, are affixed to the first shaft 312. The variable speed clutch assembly 300 also includes a driving first clutch 310 affixed to the first shaft 312, a driven second clutch 320 affixed to the second shaft 322, and an endless elongated member 330 connecting the first clutch 310 with the second clutch 320. The first clutch 310 includes a pulley 314 with a pair of halves 316 mounted for movement to and away from each other along an axis of the first shaft 312. The second clutch 320 includes a pulley 324 with a pair of halves 326 mounted for movement to and away from each other along an axis of the second shaft 322. The pulley 324 rotates at greater speeds than a pulley 314. The blades are not shown but would be connected to the first shaft 312. The second shaft 322 will be connected to or be a part of the electric generator shaft.

EMBODIMENTS

Embodiment A

A battery charger comprises a bladed rotor; a shaft coupled to the bladed rotor and extending outwardly therefrom; an alternator coupled to a distal end of the shaft; a flap designed to move between a first position where the flap directs an air flow onto the bladed rotor and a second position where the flap prevents the air flow onto the bladed rotor; a lip on one edge of the flap to move the flap into the first position due to a presence of the air flow; and a biasing member designed to move the flap into the second position upon an absence of the air flow; the air flow causing a generation of an electric energy at the alternator due to a rotation of the bladed rotor and the rotation of the shaft.

A feature of this embodiment is that the biasing member comprises a spring.

Embodiment B

A battery charger comprises a housing with a hollow interior, an air inlet, and an air outlet; a bladed rotor mounted for a rotation within the housing; a shaft coupled to the bladed rotor and extending outwardly from an exterior surface of the housing; an air duct with a hollow interior, the hollow interior of the air duct being in a selective air flow communication with the hollow interior of the housing; a pivot connection between the air duct and the housing where the air duct is designed to pivot between a first position where the air duct directs the air flow onto the bladed rotor and a second position where the air duct prevents the air flow onto the bladed rotor; a lip on one edge of the air duct to move the air duct into the first position due to a presence of the air flow; and a biasing member designed to move the air duct into the second position upon an absence of the air flow.

A feature of this embodiment is that the battery charger further comprise a generator coupled to a distal end of the shaft, the air flow causing a generation of an electric energy at the generator due to a rotation of the bladed rotor and the rotation of the shaft.

A feature of this embodiment is that the battery charger further comprises a generator with a shaft; a first clutch affixed to the shaft that is coupled to the bladed rotor; a second clutch affixed to the shaft in the generator; and an endless elongated member connecting said first clutch with said second clutch; the battery charger configured to convert a kinetic energy of the air flow into an electric energy at the generator.

A feature of this embodiment is that the pivot connection comprises an elastomeric sleeve, the elastomeric sleeve connecting one end of the air duct to the air inlet.

A feature of this embodiment is that the biasing member comprises an extension spring.

A feature of this embodiment is that the biasing member comprises a compression spring.

A feature of this embodiment is that the battery charger further comprises a flange on an exterior surface of the air duct.

A feature of this embodiment is that the battery charger further comprises a gasket on an exterior surface of the air duct.

A feature of this embodiment is that the battery charger further comprises a lip on another edge of the air duct.

A feature of this embodiment is that the bladed rotor rotates about a vertical axis.

A feature of this embodiment is that the bladed rotor rotates about a horizontal axis.

A feature of this embodiment is that the battery charger further comprises a gasket on a peripheral surface of the air duct.

Embodiment C

A battery charger comprises a housing with a hollow interior, an air inlet, and an air outlet; a bladed rotor mounted for a rotation within the housing; a shaft coupled to the bladed rotor and extending outwardly from an exterior surface of the housing; an air duct with a hollow interior, the hollow interior of the air duct being in a selective air flow communication with the hollow interior of the housing; and an actuator coupled to the air duct, the actuator designed to move the air duct between a first position where the air duct directs the air flow onto the bladed rotor and a second position where the air duct prevents the air flow onto the bladed rotor.

Embodiment D

A battery charger comprises a housing with a hollow interior, an air inlet, and an air outlet; a bladed rotor mounted for a rotation within the housing; a shaft coupled to the bladed rotor and extending outwardly from an exterior surface of the housing; and an air duct with a hollow interior being in a selective air flow communication with the hollow interior of the housing, the air duct designed to move between a first position where the air duct directs the air flow onto the bladed rotor and a second position where the air duct prevents the air flow onto the bladed rotor.

Embodiment E

An air flow powered generator for a vehicle comprises a housing with a hollow interior; a bladed rotor mounted for a rotation within the housing; a shaft coupled to the bladed rotor and extending outwardly from an exterior surface of the housing; an air duct with a hollow interior, the hollow interior of the air duct being in an air flow communication with a hollow interior of the housing; a pivot connection between the air duct and the housing where the air duct is designed to pivot between a first position where the air duct directs the air flow onto the bladed rotor and a second position where the air duct prevents the air flow onto the bladed rotor; a lip on one edge of the air duct to move the air duct into the first position due to a presence of the air flow; and a biasing member designed to move the air duct into the second position upon an absence of the air flow.

Embodiment F

A vehicle comprises a vehicle body; two wheel assemblies supporting the vehicle body thereon; a battery; a drive system designed to convert electric energy into a mechanical energy to rotate wheels within the two wheel assemblies; a controller designed to receive and regulate electric energy from the battery; an air duct designed to move between a first position and a second position; a lip on one edge of the air duct to move the air duct into the first position due to a presence of air flow; a biasing member designed to move the air duct into the second position upon an absence of the air flow; and a battery charger designed to charge the battery by converting, during movement of the vehicle, a kinetic energy of the air flow into an electric energy after the air duct is moved into the first position to direct the air flow toward the battery charger.

A feature of this embodiment is that the drive system comprises an electric motor, a transmission and an inverter designed to send electric energy to the electric motor causing rotation of wheels in each wheel assembly through the transmission.

A feature of this embodiment is that the battery charger comprises a bladed rotor; a shaft coupled to the bladed rotor and extending outwardly therefrom; and an alternator coupled to a distal end of the shaft; the air flow causing a generation of an electric energy at the alternator due to a rotation of the bladed rotor and the rotation of the shaft.

Embodiment G

A vehicle comprises a vehicle body; two wheel assemblies supporting the vehicle body thereon; a battery; a drive system designed to convert electric energy into a mechanical energy to rotate wheels within the two wheel assemblies; a controller; an electric energy generator designed to supply, during movement of the vehicle, the electric energy by converting a kinetic energy of air flow into the electric energy; and an air duct with a hollow interior, the air duct designed to move between a first position where the air duct directs the air flow to the electric energy generator and a second position where the air duct prevents the air flow to the electric energy generator.

A feature of this embodiment is that the drive system comprises an electric motor, and a transmission, wherein the electric motor causes, upon receiving the electric energy, rotation of wheels in each wheel assembly through the transmission.

A feature of this embodiment is that the vehicle body comprises an opening through a thickness of a bottom wall and wherein the air duct is mounted to move within the opening.

A feature of this embodiment is that the air duct comprises a lip on one leading edge of the air duct, the lip extending outwardly from an exterior surface of the body when the air duct is disposed in the second position.

A feature of this embodiment is that the vehicle further comprises a spring positioned in a contact with the air duct to move the air duct into the second position upon absence of the air flow.

A feature of this embodiment is that the vehicle further comprises an actuator connected to the air duct and electrically connected to the controller, the actuator designed to move the air duct into the first position in a response to a first control signal received from the controller, the actuator designed to move the air duct into the second position in a response to a second control signal received from the controller.

A feature of this embodiment is that the first control signal indicates one of a movement and a speed of the vehicle.

A feature of this embodiment is that the air duct comprises a screen mounted to prevent debris infiltration into the hollow interior.

A feature of this embodiment is that the vehicle further comprises a heater mounted adjacent a periphery of the air duct, the heater being electrically connected to the controller and is being operable in a response to a temperature signal from the controller.

A feature of this embodiment is that the heater comprises a Peltier device.

A feature of this embodiment is that the heater comprises a coil mounted within the hollow interior and electrically connected to a supply of electric energy.

A feature of this embodiment is that the vehicle further comprises a temperature sensor being electrically connected to the controller, the sensor configured to measure temperature of the air duct and input a signal into the controller, the signal defining a value of the temperature measured by the temperature sensor.

A feature of this embodiment is that the controller is configured to output the temperature signal when a value of the temperature measured by the sensor is lower than a temperature threshold.

A feature of this embodiment is that the vehicle further comprises a sensor configured to measure air flow within the hollow interior of the air duct.

A feature of this embodiment is that the vehicle further comprises a blower operable to supply a flow of heated air into the hollow interior.

Embodiment H

A vehicle comprises a vehicle body, the vehicle body comprising an opening through a thickness of a bottom wall; two wheel assemblies supporting the vehicle body thereon; a battery; a drive system comprising an electric motor, and a transmission, the electric motor designed to convert electric energy into a mechanical energy to rotate wheels within each wheel assembly through the transmission; a controller; an electric energy generator coupled to one of the electric motor, the battery and a combination thereof, the electric energy generator designed to supply, during movement of the vehicle, the electric energy by converting a kinetic energy of air flow into the electric energy; and an air duct with a hollow interior, the air duct being at least partially mounted within the opening, the air duct designed to move between a first position where the air duct directs the air flow to the electric energy generator and a second position where the air duct prevents the air flow to the electric energy generator.

A feature of this embodiment is that the electric motor comprises four electric motors, each electric motor from the four electric motors positioned and designed to rotate one wheel.

Embodiment I

An alternator comprises an outer cover; a stationary stator with a magnetic field, the stator defining an axis of rotation; a rotor with an armature, the rotor being mounted for a rotation about the axis of the rotation; and a plurality of cups, each cup from the plurality of cups being attached to the stator for a rotation therewith, the each cup having an opening distal to the axis of rotation, the opening designed to expel moisture outwardly from an interior of the cup; the alternator designed to generate alternative current (AC) in a response to a rotation of the cups due to air flow applied thereto.

Embodiment J

A blade comprises a concave shape defining a peripheral edge and a blade cavity, the peripheral edge comprising; a curved upper portion; a curved lower portion; a curved proximal end portion joining the curved upper and lower portions; and a distal end portion.

A feature of this embodiment is that the blade further comprises an opening in each of the peripheral edge and the blade cavity, at the distal end portion A feature of this embodiment is that the curved upper and lower portions converging with each other at the distal end portion.

A feature of this embodiment is that the distal end portion comprises a curved shape.

A feature of this embodiment is that the distal end portion is smaller than the curved proximal end portion.

A feature of this embodiment is that the peripheral edge defines a teardrop shape of the blade.

A feature of this embodiment is that a distance between apexes of the distal and curved proximal end portions is larger than a distance between apexes of the curved upper and lower portions.

Embodiment K

An apparatus comprises an axle extending along a rotational axis; and a plurality of blades coupled to the axle for a rotation therewith about the rotational axis, each blade comprising a concave shape defining a peripheral edge and a blade cavity, the peripheral edge comprising a curved upper portion, a curved lower portion, a curved proximal end portion joining the curved upper and lower portions, a distal end portion, and an opening in each of the peripheral edge and the blade cavity, at the distal end portion.

Embodiment L

An apparatus comprises an axle extending along a rotational axis; and a plurality of teardrop shaped blades coupled to the axle for a rotation therewith about the rotational axis.

A feature of this embodiment is that the apparatus further comprises a generator of electric energy, the generator coupled to the axle.

A feature of this embodiment is that the generator comprises an alternator.

A feature of this embodiment is that the generator generates alternative current (AC).

A feature of this embodiment is that the generator generates direct current (DC).

Embodiment M

A horizontal shaft wind generator comprises a horizontal windmill comprising a generally vertical drive shaft mounted for rotation about a vertical axis, at least one wind drive unit mounted in a wind catching position on the drive shaft, the wind drive unit including a transverse cross member non-rotatably attached to the drive shaft, and at least two wind catcher elements mounted on the cross member on opposite sides of a pole and spaced radially outwardly therefrom, each wind catcher element having front and rear sides and a moisture discharge opening distal to the drive shaft, with the front side presenting greater resistance to wind flow thereover than the rear side when the sides are facing in an upwind direction, the wind catcher elements on each side of the cross member facing in opposite directions, such that a wind urges the drive unit to rotate in a direction wherein an upward facing front side is moving in a downwind direction; and an electric generator drivingly connected to the drive shaft so as to produce electric energy in response to the rotation of the drive shaft.

Embodiment N

A method comprises the steps of opening an air intake of a wind turbine; rotating a bladed rotor in a response to air flow through the air intake; generating alternative current in a response to a rotation of the bladed rotor; and driving a traction motor of an electric vehicle with the alternative current.

Embodiment O

A method comprises the steps of opening an air intake of a wind turbine in a response to an air flow external to the wind turbine; rotating a bladed rotor in a response to the air flow through the air intake; generating alternative current in a response to a rotation of the bladed rotor; and driving a traction motor of an electric vehicle with the alternative current.

Embodiment P

A method comprises the steps opening an air intake of a wind turbine; rotating bladed rotor in a response to air flow through the air intake; generating alternative current in a response to a rotation of the bladed rotor; converting the alternative current to a direct current; and charging an electric battery with the direct current.

Embodiment Q

A method comprises the steps of opening an air intake of a wind turbine; rotating bladed rotor in a response to air flow through the air intake; generating a direct current in a response to a rotation of the bladed rotor; and charging an electric battery with the direct current.

Embodiment R

A wind energy harvesting apparatus comprises a first shaft; a second shaft mounted in a side-by-side spaced apart relationship with the first shaft; blades affixed to a first shaft, each blade comprising a teardrop shape; and a variable clutch arrangement comprising a driving first clutch affixed to the first shaft, a driven second clutch affixed to a second shaft, an endless elongated member connecting the first clutch with the second clutch, each of the first and second clutches includes a pulley defined by a pair of halves mounted for movement to and away from each other along an axis of a respective rotor shaft, a pulley on the second clutch rotates at greater speeds than a pulley on the first clutch.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present Application or of any further Application derived therefrom.

The bladed rotor, as described above, may be referred to as a flywheel or a paddle wheel.

The chosen exemplary embodiments of the claimed subject matter have been described and illustrated, to plan and/or cross section illustrations that are schematic illustrations of idealized embodiments, for practical purposes so as to enable any person skilled in the art to which it pertains to make and use the same. As such, variations from the shapes of the illustrations as result, for example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded and rounded angles may be sharp. Thus, the regions illustrated in the figures are schematic in nature and their shapes are not intended to illustrate the precise shape or a region and are not intended to limit the scope of the present claims. It will be understood that variations, modifications, equivalents and substitutions for components of the specifically described exemplary embodiments of the invention may be made by those skilled in the art without departing from the spirit and scope of the invention as set forth in the appended claims.

What is claimed is:

1. An apparatus, comprising:
an axle, the axle defining a rotational axis;
a blade attached to the axle for a rotation therewith about the rotational axis, the blade comprising a wall and a peripheral edge defining, in a combination with each other, a cavity of the blade; and
one of:
an opening in each of the peripheral edge and the cavity and being disposed at an end of the wall disposed furthest from the axle, and
an extension at an end of the wall disposed furthest from the axle and a passageway in the extension, the passageway being in an open communication with the cavity.

2. The apparatus of claim 1, wherein the peripheral edge defines a teardrop shape of the blade.

3. The apparatus of claim 1, wherein the peripheral edge comprises:
a first portion;
a second portion;
a proximal end joining first and second portions; and
a distal end joining the first and second portions.

4. The apparatus of claim 3, wherein the first and second portions converge with each other at the distal end.

5. The apparatus of claim 3, wherein the proximal end comprises a curved shape.

6. The apparatus of claim 3, wherein the distal end is smaller than the proximal end.

7. The apparatus of claim 3, wherein a distance between apexes of distal and proximal ends is greater than a distance between first and second portions.

8. The apparatus of claim 1, further comprising a housing with a hollow interior and with an inlet and an outlet, the hollow interior being sized and shaped to mount the axle with the blade for a rotation within the hollow interior.

9. The apparatus of claim 8, wherein the housing further comprises a flap mounted for a movement between a first position where the flap allows air flow onto the blade and a second position where the flap prevents the air flow onto the blade.

10. The apparatus of claim 8, further comprising an air duct.

11. The apparatus of claim 10, further comprising a hinged connection between the air duct and an inlet, where the air duct movable between a first position allowing air flow onto the blade and a second position preventing the air flow onto the blade.

12. The apparatus of claim 11, wherein the hinged connection comprises a flexible sleeve.

13. The apparatus of claim 1, further comprising a generator of electric energy, the generator connected to the axle.

14. The apparatus of claim 1, wherein the peripheral edge comprises:
a first end with a curved shape; and
two straight edge portions extending from the first end and converging toward each other at a second end;
the peripheral edge defining a teardrop shape of the blade.

15. An apparatus, comprising:
a housing with a hollow interior, an air inlet in an air flow communication with the hollow interior and an air outlet in the air flow communication with the hollow interior; and
a bladed rotor mounted for a rotation within the hollow interior, the bladed rotor comprises:
an axle, and
a plurality of teardrop-shaped blades radially extending from the axle for a rotation therewith about a rotational axis, each teardrop-shaped blade at least including a wall and a peripheral edge defining, in a combination with each other, a cavity of the each teardrop-shaped blade, and
one of:
an opening in each of the peripheral edge and the cavity and being disposed at an end of the wall disposed furthest from the axle, and
an extension at an end of the wall disposed furthest from the axle and a passageway in the extension, the passageway being in an open communication with the cavity.

16. The apparatus of claim 15, further comprising a generator of electric energy, the generator connected to the axle.

17. The apparatus of claim 15, further comprising an air directing component designed to move between a first position and a second position.

18. A vehicle, comprising:
a vehicle body;
wheel assemblies supporting the vehicle body thereon;
a battery;
a drive system designed to convert electric energy into a mechanical energy to rotate wheels within the wheel assemblies;
a controller designed to receive and regulate electric energy from the battery;
an air directing component designed to move between a first position and a second position;
a lip on one edge of the air directing component, the lip extending outwardly from a vehicle surface to move the air directing component into the first position in a response to a presence of an air flow;
a biasing member designed to move the air directing component into the second position in a response to an absence of the air flow; and
a generator of an electric energy mounted adjacent an opening in a floor board of the vehicle, the generator designed to convert a kinetic energy of the air flow into the electric energy in a response to the air directing component being in the first position to direct the air flow toward the generator, the generator at least including:
a bladed rotor mounted for a rotation within the hollow interior, the bladed rotor at least including:
an axle,
a plurality of teardrop-shaped blades radially extending from the axle for a rotation therewith about a rotational axis, each teardrop-shaped blade at least including a wall and a peripheral edge defining, in a combination with each other, a cavity of the each teardrop-shaped blade, and
one of:
an opening in each of the peripheral edge and the cavity and being disposed at an end of the wall disposed furthest from the axle, and
an extension at an end of the wall disposed furthest from the axle and a passageway in the extension, the passageway being in an open communication with the cavity.

19. The vehicle of claim 18, wherein the vehicle further comprises a hinged connection between the air directing component and the floor board of the vehicle to selectively open and close the opening.

20. The vehicle of claim 19, wherein the hinged connection comprises a flexible sleeve.

* * * * *